ER
UNITED STATES PATENT OFFICE.

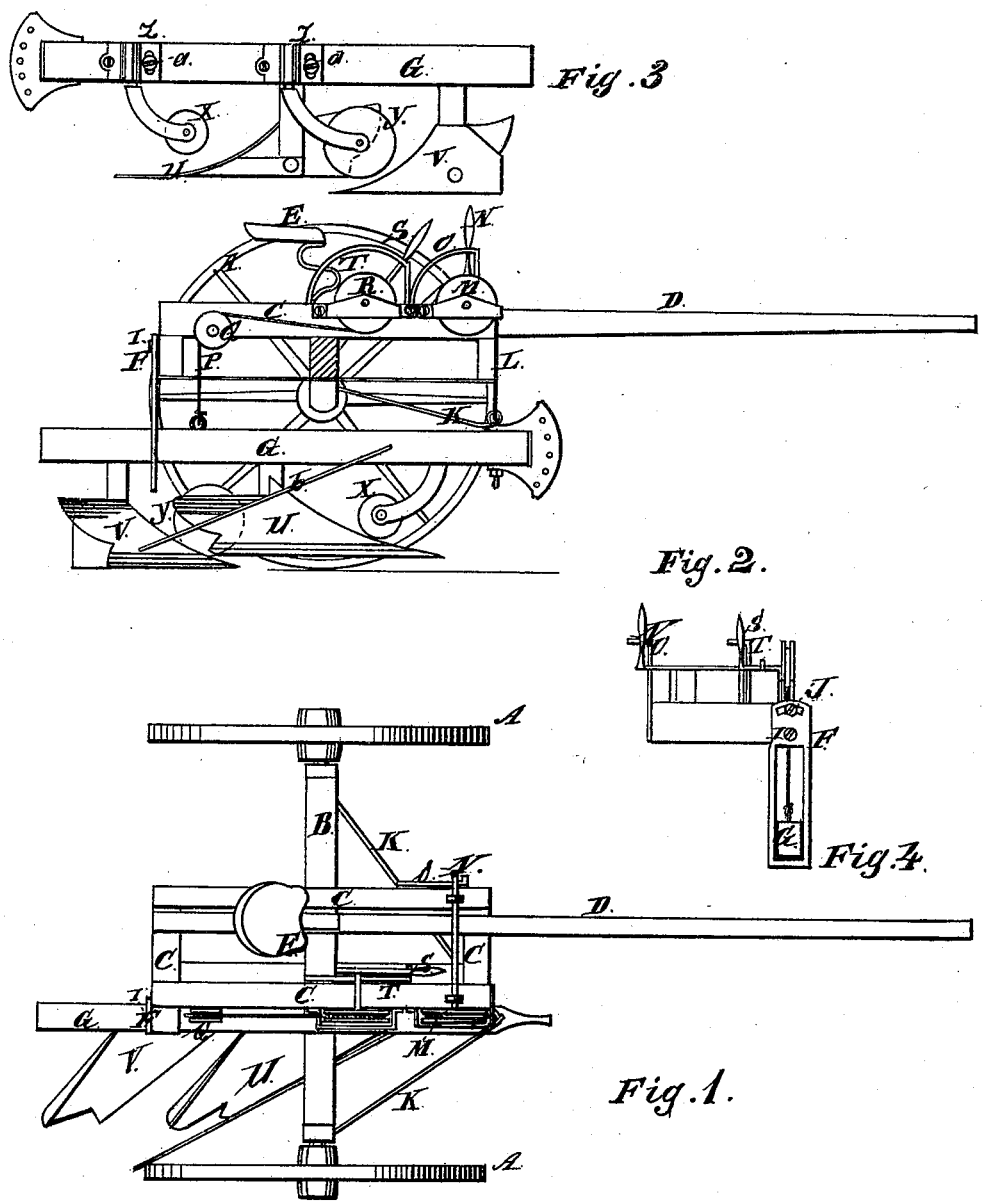

SMILEY KIRKPATRICK, OF WATERMAN, ILLINOIS.

IMPROVEMENT IN GANG-PLOWS.

Specification forming part of Letters Patent No. 180,137, dated July 25, 1876; application filed May 26, 1875.

*To all whom it may concern:*

Be it known that I, SMILEY KIRKPATRICK, of Waterman, in the county of De Kalb, State of Illinois, have invented a Breaking Subsoil Gang-Plow, of which the following is a specification, reference being had to the accompanying drawings, which form a part hereof.

The object of my invention is to make a breaking-plow which can be readily handled (being suspended upon wheels) by a riding operator, and at the same time be easily drawn, and turn a thin turf furrow, followed by a second furrow of subsoil, which is thrown over it.

My invention consists in the devices for attaching and controlling the plows, and also in the combination of the colters and mechanisms hereinafter described, by which they are adjusted, as hereinafter fully described and shown.

In the accompanying drawings, Figure 1 represents a top or plan view of my invention; Fig. 2, a vertical section, taken at the line $x\ x$ of Fig. 1; Fig. 3, a side view of the plow-beam and plow detached from the sulky. Fig. 4 represents a rear view of the adjustable frame.

A A represent the wheels, which are made in the ordinary style of wheels adapted for that purpose. B is the axle. C is a frame securely fastened to the axle B. D is the pole attached to this frame and axle. E is the driver's seat. F is an adjustable hanger suspended from the frame C. It serves as a guide and holder of the plow-beam G. The frame is pivoted to the frame C, and may be adjusted on its pivot I, and held at any desired angle by tightening a bolt in the slot J. The plow-beam G is braced laterally by rods K K, which extend from the front end of the beam to the axle, as shown. The front end of the beam is suspended upon a chain, L, that winds upon the wheel M. The operator turns this wheel by the lever N, which is held in any desired position by the notch-segment O. The rear end of the beam G is suspended by the chain P, which passes over the pulley Q, and is attached to the wheel R. The operator turns this wheel R by the lever S, which is held in any desired position by the notch-segment T. It will be observed that the operator can raise or lower the front end of the plow-beam to throw the plows out of or into the ground by moving the lever N. U is a breaking-plow, adapted to turn the sod. V is the rear plow, hung directly in the rear of the plow U, and takes the soil from directly below the furrow of the front plow and turns it in a loose mellow condition upon the sod-furrow turned by the front plow. The plow V is made of the proper shape to loosen and break its furrow. X is a colter, adapted to cut the sod for the front plow, and Y is a colter to cut the subsoil-furrow turned by the second plow. These colters are hung on crooked standards, which pass under the pivoted slotted irons Z. $a\ a$ are bolts passing through the slots in the iron Z, to hold the colters at any desired height. It will be observed that these adjusting pivoted irons, by moving the slots on the bolts $a\ a$, raise and lower the colters, because they are attached to curved standards. It will also be observed that the plows may be thrown into an oblique position, and thrown toward or from the land by turning the frame F upon its pivot. The frame is held at any desired position by the bolt I, which passes through the slot J in the frame.

The levers N and S, by which the operator raises and lowers the plows, may be in the form of treadles to be operated by the feet of the operator instead of by his hands. The tongue D is arranged in the frame C relatively to the plow-beam in such a manner as to adapt the plow to three horses, the two next to the tongue walking upon the unbroken land, while one walks in the last furrow of the plow. $b$ is a rod extending out over the mold-board of the front plow to carry any refuse and grass or other material in under the furrow, where it will be covered up.

I find that by breaking land with my plow the sod is so thoroughly covered and excluded from the air by such a thickness of light pulverized soil that I am able to produce an extraordinary fine crop the first year.

I am aware of Letters Patent No. 141,073, granted to J. C. Pearl, July 22, 1873, and No. 154,293, granted to W. Starling, August 18, 1874, and I diclaim the devices described and shown in these patents. The devices used in my plow, which I have described above, differ in construction and operation from the inventions set forth in the patents above mentioned, and I base my claims upon these differences.

Having described my invention, what I claim as new, and desire to secure by Letters Patent, is—

1. The combination of the hanger F, pivoted to the tongue-frame, and provided with an adjusting-slot, tightening-bolt for fastening the hanger, and plow-beam G, supported in the hanger, all constructed and operating as described, for the purpose of adjusting the rear end of the plow-beam laterally, substantially as set forth.

2. The combination of the plow-beam G, pivoted colter-plate Z, and curved colter-standard, all constructed and operating as described, for the purpose of holding the colter-standard to the plow-beam, and adjusting it thereon, substantially as set forth.

SMILEY KIRKPATRICK.

Witnesses:
HEINRICH F. BRUNS,
E. M. CRANDALL.